Dec. 20, 1932. C. R. NICHOLS 1,891,628
METHOD OF DETERMINING ANGLE AND DIRECTION OF DIP OF GEOLOGICAL FORMATIONS
Filed Nov. 22, 1930 4 Sheets-Sheet 1

WITNESS:

INVENTOR
Charles R. Nichols
BY
ATTORNEYS.

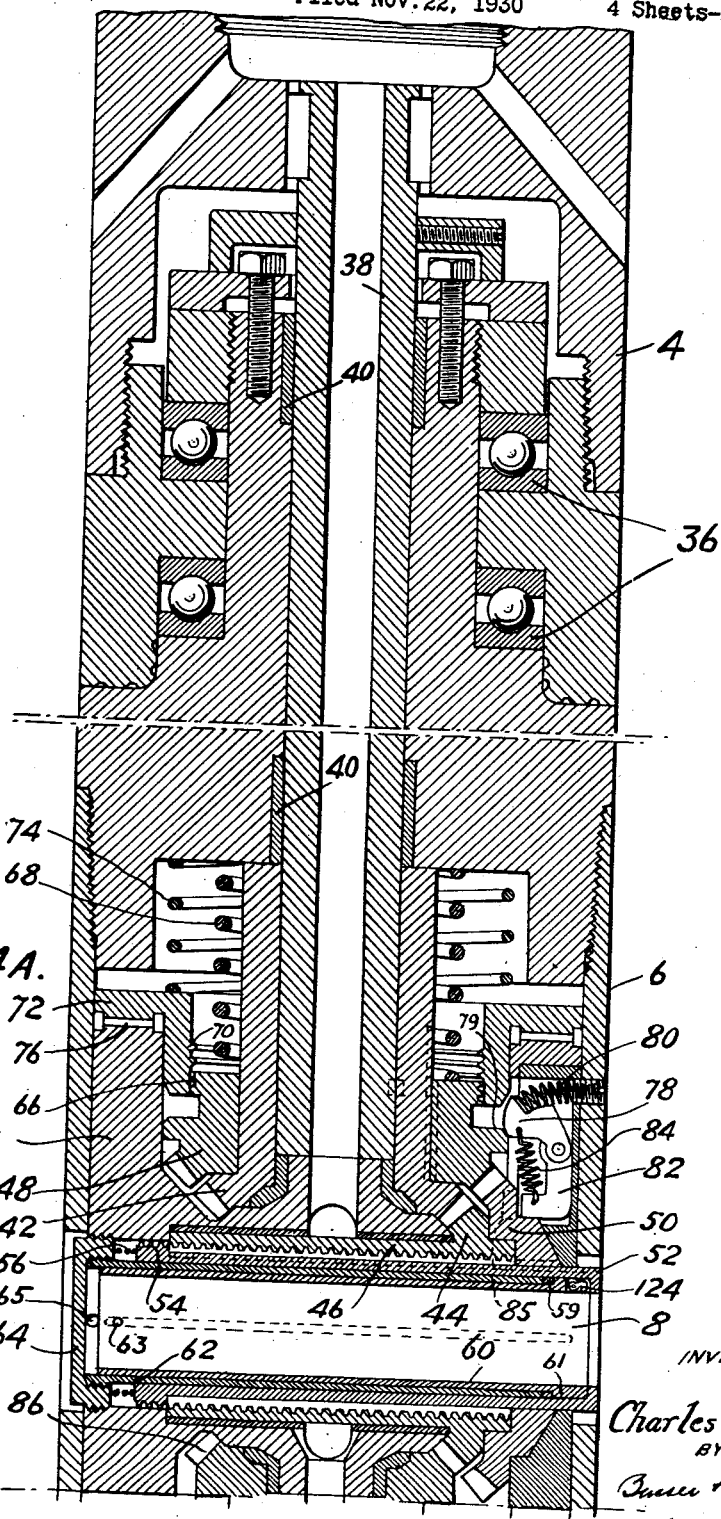

Dec. 20, 1932.    C. R. NICHOLS    1,891,628
METHOD OF DETERMINING ANGLE AND DIRECTION OF DIP OF GEOLOGICAL FORMATIONS
Filed Nov. 22, 1930    4 Sheets-Sheet 4

WITNESS:

INVENTOR
Charles R. Nichols
BY
ATTORNEYS.

UNITED STATES PATENT OFFICE

CHARLES R. NICHOLS, OF DALLAS, TEXAS, ASSIGNOR TO SPERRY-SUN WELL SURVEYING COMPANY, OF PHILADELPHIA, PENNSYLVANIA, A CORPORATION OF DELAWARE

METHOD OF DETERMINING ANGLE AND DIRECTION OF DIP OF GEOLOGICAL FORMATIONS

Application filed November 22, 1930. Serial No. 497,430.

This invention relates to a method of determining the angle and direction of dip of geological formations which are inaccessible for direct measurement, for example, the formations encountered by the path of a bore hole.

The geological conditions under which oil occurs are well known and in general if a geologist knows the direction and amount of dip and strike of the bedding planes through which a producing well passes together with the observed characteristics of the well, he may with considerable accuracy locate another well which may more completely exhaust the accumulation of oil. While many factors may enter into the making of proper deductions, one of the most important is the accurate determination of the direction and amount of inclination of the oil producing horizon and adjacent beds.

The need for some device for securing oriented cores from drill holes has long been recognized by petroleum engineers and geologists. The information obtained from oriented cores would be of great value in the solution of geologic structural problems and all other problems related thereto.

Various attempts have been made to ascertain with precision the direction and angle of dip of the formations through which a bore hole passes. The simplest method which suggests itself is to take a core whose axis is aligned with the bore hole, providing some such means as a compass designed to bear a definite relationship with the core at the time of its formation and arranged to be locked in some manner so that when the coring instrument is withdrawn, the direction of the strata plane is determinable.

This method fails both theoretically and practically. Its theoretical failure is due to the fact that a compass cannot be depended on to give true readings because of the presence of magnetic deposits and the practically inevitable presence near the needle of iron portions of the apparatus which generally become powerfully magnetized in use. One cause of practical failure is the fact that the determination is at best related not to the true vertical but the axis of the bore hole which is quite generally considerably out of the vertical. But the primary cause of failure is due to the difficulty in obtaining unbroken cores, the coring generally producing a number of "biscuits" of short axial length which rotate relatively to each other and to any aligning means which happens to be provided for the purpose of fixing the core relatively to the compass.

One method for determining the direction and amount of dip involves the measurement of the depth down three adjacent holes to a recognizable formation. This method, however, is not always practicable.

It is the broad object of the present invention to provide a method of accurately and rapidly determining the angle and direction of dip of formations, which method is readily carried out and is productive of completely accurate results irrespective of the production of broken cores; and which, in fact, involves no attempt to determine through what angle the core may have revolved during or after its extraction.

Further objects of the invention will be apparent from the following description of one preferred modification of the method and a form of apparatus designed for its practice, reference being had to the accompanying drawings, in which:

Figs. 4A and 4B are complementary figures showing the coring portion of the apparatus in axial section, certain portions being shown relatively angularly rotated for clearness, and Fig. 4B being a continuation of the bottom of Fig. 4A;

The disclosed apparatus, which is very well adapted to carry out the present method, consists of various parts forming the subject matters of several applications, namely that of S. H. Williston and C. R. Nichols, Ser. No. 400,479, filed October 18, 1929, entitled "Well surveying device", that of G. L. Kothny, Ser. No. 474,687, filed August 12, 1930, entitled "Well surveying instrument", and that of S. H. Williston, Ser. No. 499,016, filed November 29, 1930, entitled "Method of obtaining cores and instrument therefor", the last being in part a continuation of another application of S. H. Williston, Ser. No. 44,155, filed July 17, 1925, entitled "Side wall sampler".

The preferred form of apparatus for carrying out the method will be first described, followed by a description of the method and the determination of the results from the data accumulated in the performance of the method.

Figures 1, 2:
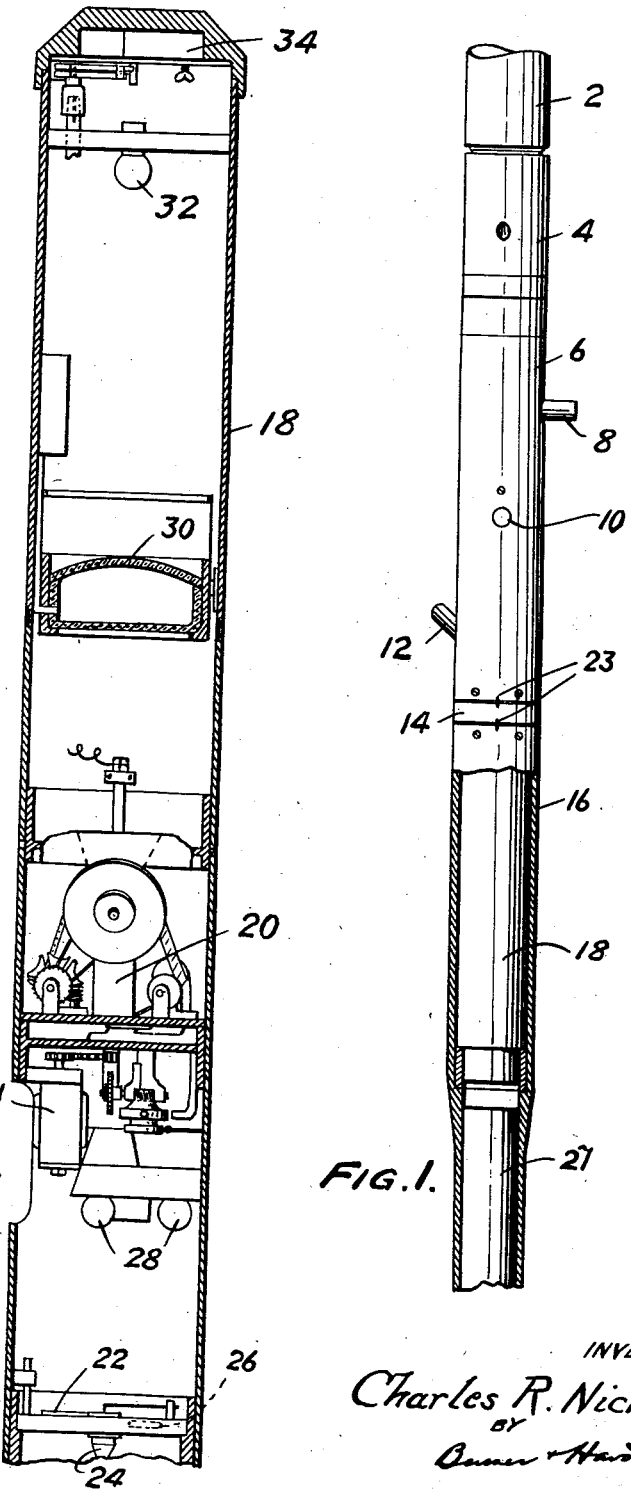
Fig. 1 is an elevation, partly in section, of a form of apparatus for carrying out the method.
Fig. 2 is an axial section through a portion of the apparatus.

Figure 1 shows the general assembly of the apparatus which is carried by the end of a drill stem 2 by means of which it is lowered to the desired point in the bore hole and operated. The lowest section of the drill stem preferably consists of a mud control jar of the type illustrated in said Williston application, Serial No. 499,016, and is threaded into a swivel head 4 which through the medium of ball bearings hereafter described supports the corer casing 6 carrying the cutters 8, 10 and 12 and enclosing the operating mechanism therefor. The corer casing is joined either directly or through an intermediate member 14 with the casing 16 enclosing a well surveying instrument 18 and batteries 27 for its operation.

The casings 6 and 16 and the instrument 18 within the casing 16 are held in fixed predetermined angular relationship, suitable markings 23 being provided to guide an operator in securing proper alignment, and similar means being provided between casing 16 and instrument 18.

The instrument 18, shown in section in Fig. 2, is of the type illustrated and claimed in the application of Williston and Nichols modified for operation on the end of a drill stem, as described and claimed in the above mentioned Kothny application. The instrument comprises a casing supporting a motion picture camera 20 capable of photographing simultaneously in both directions and utilizing film intermittently fed by means of a motor 21 and a suitable Geneva or equivalent mechanism. The camera is arranged to photograph a pointer 22 moving adjacent a fixed scale and held oriented by a gyroscope 24. A chronometer 26 is simultaneously photographed whereby a record is made from which the depth at which the photographs are produced may be ascertained if a suitable record is made of corresponding times and depths at the surface. The pointer, scale and chronometer are intermittently illuminated while the film is stationary by lamps 28 which are caused to flash by devices controlled by motor 21. Above the camera and photographed simultaneously with the lower instruments, is a level 30 illuminated by a lamp 32 in the same circuit as lamps 28.

While the Williston and Nichols application shows an instrument designed to produce exposures of the film at short intervals, since the present device is relatively slow in operation it is preferable to use the apparatus as modified in accordance with the Kothny application by the use of a clockwork mechanism 34 which produces intermittent operation of the motor 21 so that exposures are produced only at relatively widely spaced intervals.

Figure 4B:
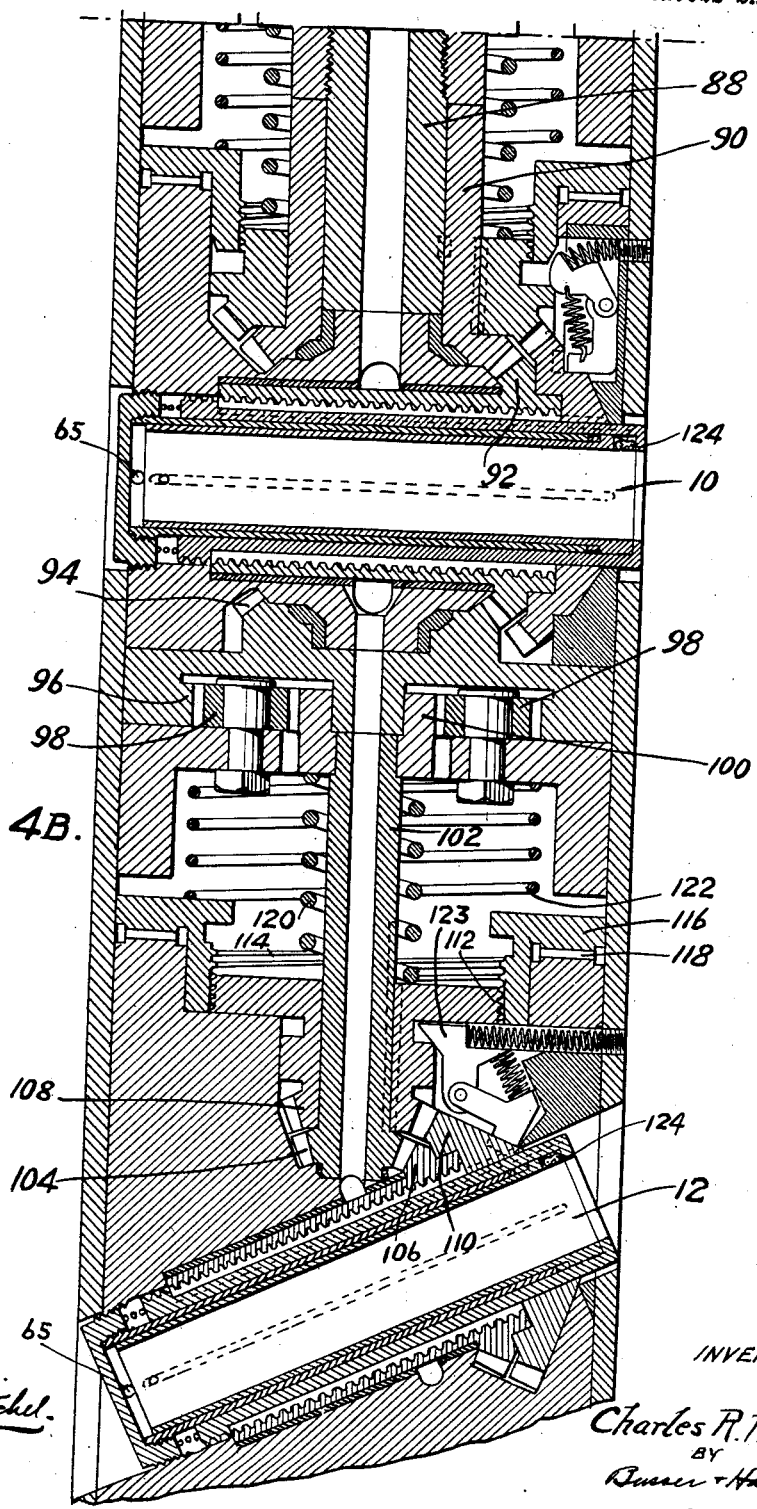

The details of the coring mechanism within the casing 6 are illustrated in Figures 4A and 4B. The swivel head 4 supports the casing 6 through the medium of ball bearings as indicated at 36. The use of antifriction bearings at this point is necessary since the coring cutters are operated by rotation of the drill stem and the swivel head 4 relatively to the stationary casing 6.

If the friction is properly eliminated between 4 and 6, it is comparatively easy to maintain casing 6 stationary in the bore hole during rotation of the drill stem to effect coring. This may be accomplished in several ways. If the apparatus is to operate in the bottom of a hole, a fish tail bit may be secured to the casing of the well surveying instrument. Engagement of this with the bottom of the hole will prevent rotation. If the apparatus is to operate in an intermediate portion of a hole, suitable pivoted dogs may be provided on the casing 6 to engage the walls of the hole and prevent rotation. Or a device similar to a wall packer may be used to lock the casing. Of course, the coring cutters additionally serve to prevent rotation after they engage the walls of the hole.

Secured to the head 4 so as to rotate therewith is a shaft 38, mounted in bushings 40 carried by casing 6, and formed hollow to provide for the free circulation of mud. Keyed to the shaft 38 is a bevel gear 42 meshing with a bevel gear 44 carried by an internally threaded cylindrical nut 46 journalled in the casing for rotation but being held against axial movement. Splined to the hub of the gear 42 so as to rotate therewith but be capable of axial upward movement, is a bevel gear 48 meshing with a rotatable but axially fixed bevel gear 50 having a splined connection with the cutter sleeve 52 which carries at its inner end a threaded portion 54, initially out of mesh with, but pressed against, the end of nut 46 by a small spring 56.

The cutter sleeve 52 carries the cutter ring 58, suitably provided with diamond, stellite, or similar cutters. The cutter ring 58 provides, together with a ring 59 carried by the sleeve 52, an annular groove receiving a flange 61 formed on the annular core retaining sleeve 60 which carries a pin 63 extending into a longitudinal groove formed in the stationary sleeve 62 carried by the core removal cap 64 fixed in the casing. The sleeve 62 forms a support for the cutter sleeve and the parts associated therewith. The spline arrangement formed by the pin and slot connection between the sleeves 60 and 62 permits sleeve 60 to move outwardly with the cutter 52 and enclose a core cut thereby but prevents its rotation. The sleeve 60 partakes of the longitudinal movement of the cutter by reason of the reception of flange 61 rotatably between rings 58 and 59. The elements 52, 58 and 60 make up the upper cutter previously designated as a unit 8. Removal of cap 64 makes possible the complete removal of the entire cutter assembly.

The gear 48 is shown in its initial lowermost position to which it is forced by spring 68 in which threads 66 carried by its hub are out of mesh with internal threads 70 carried by the clutch member 72 pressed downwardly by spring 74 to engage teeth carried by it with teeth 76 formed on the fixed element 77. The teeth on 72 and 77 are similar and in the form of shallow waves which by reason of the action of spring 74 normally interlock to prevent rotation of 72 but which ride over each other upon the application of sufficient torque to member 72. A pivoted member 78 pressed by a spring 80 is arranged to be engaged by a flange 79 on gear 48 upon upward movement of the gear so as to urge a latch 82 yieldingly through the medium of a spring 84 to enter a notch 85 in gear 50 to lock it in fixed position. Engaging portions of 78 and 82 hold the latter retracted when the former occupies the position illustrated.

Below the cutter 8 just described is a bevel gear 86 meshing with gear 44 and secured to a hollow shaft 88 equivalent to shaft 38 and serving to transmit operating power to the mechanism associated with the intermediate cutter 10. This mechanism is identical with that associated with the upper cutter and is therefore not described in detail, the corresponding elements being readily recognizable, for instance, gears 90 and 92 correspond exactly with gears 42 and 44, etc.

From the cutter 10 motion is transmitted to the lower cutter 12 which forms other than a right angle with the instrument axis. For effecting this, the bevel gear 92 meshes with the bevel gear 94 formed integral with an internal gear 96 journalled in the casing. The teeth of gear 96 mesh with pinions 98, rotating on fixed axes, which in turn mesh with a central pinion 100 carried by hollow shaft 102 which has formed on its lower end a pinion 104 corresponding with gear 42 and meshing with the gear 106 corresponding to 44. A gear 108 splined on the shaft 102 meshes with gear 110, these gears corresponding with 48 and 50 respectively. The hub of gear 108 is threaded at 112 so as to be engageable with threads 114 on clutch member 116 provided with teeth engaging fixed teeth at 118. All of these parts will be recognized as having their counterparts in the mechanisms associated with cutter 8. The latch mechanism 123 is similar to that associated with member 78.

Each of the sleeves 60 is provided with one or more small core-retaining inwardly spring pressed hooks 124.

In Figures 4A and 4B, the cutters 8, 10 and 12 have been shown in the same plane for the sake of clearness in illustrating their operating mechanisms. Actually the cutters occupy positions such as are illustrated in Fig. 1 or as more clearly brought out hereafter. In the preferred form of apparatus, the center lines of both cutters 8 and 10 are at right angles to the axis of the instrument but in perpendicular axial planes while the cutter 12 forms an acute angle with the axis of the instrument and lies in an axial plane disaligned with the axial planes of the center lines of cutters 8 and 10.

It will be noted that by reason of the various connections the shafts 88 and 102 rotate oppositely from shaft 38. This, of course, necessitates reversal of threads, etc. The use of the gearing 96, 98, 100 produces a higher speed of rotation of shaft 102 compensating for the small gears 104 and 108 required by reason of the position of cutter 12. The arrangement is such that this cutter is operated at the same speed as the others.

In operation, the instrument is lowered to the desired depth on the end of a drill stem and held in position by a bottom lock or wall lock. The drill stem is then rotated in the proper direction, all of the operations being effected without change of the direction of rotation. Since all of the cutters operate in substantially the same manner and simultaneously, only the operation of cutter 8 will be described.

The ratio of gears 42 and 44 is slightly greater than the ratio of gears 48 and 50 so that upon rotation of shaft 38, sleeve 52 will rotate in the same direction but faster than nut 46. As a result threads 54 will be engaged with the threads of nut 46 by spring 56 and will then advance in the latter threads producing a slow outward movement of the cutter. Since the cutter is rotating at the high speed of gear 50 and advancing only very slowly because of the slight differential speed of gears 44 and 50, the proper conditions for the cutting of a core are provided, the core being cut from the formation at the side of the hole.

This action continues until the enlarged threaded end of sleeve 52 engages gear 50, jamming thereagainst. If there now occurred no yielding of any elements the mechanism would break. However, it will be noted that gear 48 is held in mesh with gear 50 under the action of spring 68. Furthermore the teeth of these gears are so formed that as soon as resistance is encountered by gear 50 the teeth of gear 48 ride over those of 50. As this occurs threads 66 engage threads 70, the clutch member 72 moving upward against the action of spring 74 until the threads mesh whereupon gear 48 threads itself into the now stationary clutch member. When the limit is reached (by the engagement of flange 79 with the clutch member), the clutch member and gear 48 rotate as a unit, the teeth of 72 then riding over the teeth of 77.

As gear 48 moves upwardly, it rocks member 78, which moves latch 82 to engage it with notch 85 and thereby arrest the motion of the gear 50 and sleeve 52. Since the relative rotation of the nut and cutter is reversed, continued rotation of the nut then effects the rapid withdrawal of the cutter until the inward movement ceases by reason of the disengagement of threads 54 from the nut. It will be noted that the differential speed is now quite high. The rotation of the drill stem is continued until it is certain that the cutters have been withdrawn, whereupon the instrument is raised, the cores removed and the slope and direction of the hole and orientation of the cutters determined from the records of the well surveying instrument.

It will be noted that the arrangement providing for withdrawal of the cutter after it reaches its extreme outer position also serves as a safety device, since, if the cutter encounters unusual resistance to its outward movement the same series of actions will occur as normally occur at the end of its movement, that is, the teeth of gear 42 will ride over the teeth of gear 44, etc., and the cutter will be withdrawn.

During the above operation the mud flow is preferably controlled as described in the Williston application.

The dip and strike of the encountered formations relative to the hole may now be determined, this being followed by a correction of the results in view of the inclination and direction of the bore hole in order to ascertain the true dip and strike of the formations as referred to the usual geographical system of coordinates.

Figure 3:
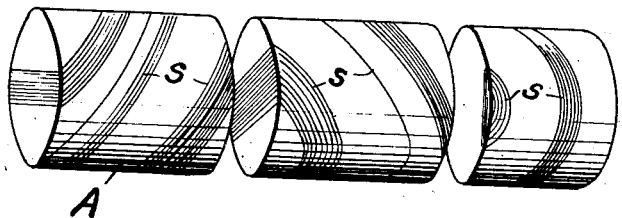
Fig. 3 is a perspective view of a core produced during the practice of the method.

In Fig. 3 there is shown a perspective view of a core A as it may be obtained from the cutter. From the operation of the present machine as noted above, it will be obvious that it would be impossible to determine from a single core the angular position it occupied in the ground, if it was badly broken up. As pointed out previously, even most elaborate precautions which might be taken frequently fail to indicate such position since quite generally the core is obtained in several sections, as indicated in the figure, which will have rotated relatively to each other and to the cutter, this being particularly true when soft formations are encountered.

Irrespective of how many sections each of the cores may be broken into, however, it is usually easy to ascertain the angle which the plane of the cored formation makes with the axis of the core (or, as used in the following discussion, the angle between the normal to this plane and the axis), if, as is generally the case, the traces of the strata planes are clearly visible on the cylindrical surface of the core as indicated at S in Fig. 3. The measurements of these angles in the three cores, taken together with the data obtained from the surveying instrument, are sufficient to determine the direction of the formation with reference to geographical coordinates without ambiguity.

Figure 5:
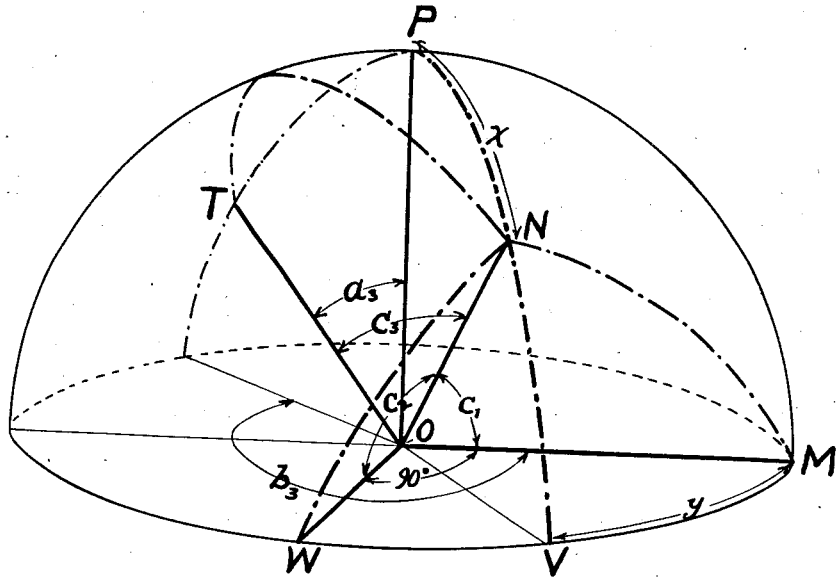
Fig. 5 is a diagram illustrating the theory involved in the determination of results from the obtained data.
Figure 6:
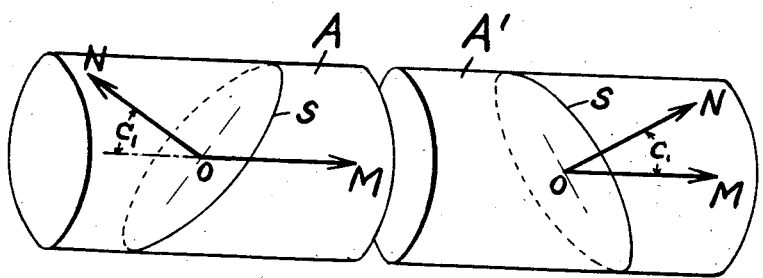
Fig. 6 is another diagram further illustrating the same matter as Fig. 5.

To render clear the possibility of determining the desired results from the data just mentioned, references may be made to the diagrams forming Figures 5 and 6. In Figure 5, OP is the axis of the instrument and bore hole, ON is the normal to the strata plane (which normal will be regarded as upward so that angle PON is always less than a right angle), OM is the axis of one core taken at a right angle to OP, OW is the axis of a second core taken at right angles to both OM and OP, and OT is the axis of the third core, lying in a plane through OP making an angle $b_3$ with OM, and forming an angle $a_3$ with the axis OP. Considering OM as origin and azimuth measured clockwise looking downward, the angles which it is desired to ascertain are $x$ and $y$ which are, respectively, the dip of ON relative to axis OP and the azimuth of ON measured from OM in a plane perpendicular to OP. It will be assumed that $x$ is always measured positively from P towards V, and accordingly that $y$ may range from 0° to 360°.

In Fig. 6 there is illustrated the same core in two positions A and A'. Assuming that it is always the acute angle $c_1$ between the normal ON and the axis OM which is measured, and remembering ON is measured upward, it will be seen that the angle MON may be either $c_1$ or $180° - c_1$ and that accordingly cos MON is equal to ± cos $c_1$, the sign being interminable from the core as obtained from the cutter. Similar considerations apply to the angles WON and TON the cosines of which are ± cos $c_2$ and ± cos $c_3$. In Fig. 5, for convenience of illustration all of these angles are shown as acute.

Considering the right spherical triangle NVM, there is obtained:

(1) $\pm \cos c_1 = \sin x \sin y$.

Similarly from the right triangle NVW:

(2) $\pm \cos c_2 = \sin x \sin y$.

Solving (1) and (2) for functions of $x$ and $y$ there is obtained:

(3) $\quad \sin x = \sqrt{\cos^2 c_1 + \cos^2 c_2}$ (4) $\quad \tan y = \pm \dfrac{\cos c_2}{\cos c_1}$ Since $x$ is assumed positive and less than 90°, $\sin x$ is always positive.

These equations show the ambiguity of the results obtained from two cores alone. The ambiguity of the signs of $\tan y$ indicates the four possible values for $y$; namely, $y_1$, $-y_1$, $180° + y_1$, and $180° - y_1$. There are therefore four possible solutions for the equations.

In order to determine which of the solutions of (3) and (4) will give a true indication of the direction of the strata plane, it is necessary to use the data from the third core. From the oblique triangle PTN, since $NT = c_3$, $PN = x$, $PT = a_3$ and $TPN = (b_3 - y)$, there is obtained:

(5) $\quad \pm \cos c_3 = \cos a_3 \cos x + \sin a_3 \sin x \cos (b_3 - y)$.

Obviously the proper values of $x$ and $y$ must satisfy this equation, and accordingly $y$ may be ascertained by substituting in (5) the values from (4) until equality is obtained.

For (5) to be useful in giving a definite value to $y$ certain conditions must be satisfied which indicate the limitations upon the axis OT.

The term $\cos a_3 \cos x$ must not disappear since otherwise $x_1$, $y_1$ and $x_1$, $180° + y_1$, or other pairs would both satisfy the equation. This condition means that $\cos a_3$ must not be zero, or in other words, OT must not be perpendicular to OP.

The term $\cos a_3 \cos x$ might also disappear under conditions of use if $\cos x$ happened to be zero by reason of the parallelism of the strata plane with OP. In this case, however, the direction of the normal is ascertainable.

Obviously the term $\sin a_3 \sin x \cos (b_3 - y)$ must not disappear. Therefore $\sin a_3$ must not be zero; that is, OT must not be parallel with OP.

If $\sin x$ is zero, the azimuth of the normal ON has no meaning since the strata plane is perpendicular to OP.

If $\cos (b_3 - y) = 0$, expansion gives $$\tan y = -\frac{\cos b_3}{\sin b_3}$$

Since both the sign and value of $$\frac{\cos b_3}{\sin b_3}$$

are known from the constants of the instrument, the sign of $\tan y$ is known. But it is impossible to determine the sign of either $\sin y$ or $\cos y$ and accordingly there are two possible solutions. The equation $\cos (b_3 - y) = 0$ indicates the accidental occurrence of plane NOP perpendicular to plane TOP, which, therefore, gives rise to an ambiguity.

The expansion of $\cos (b_3 - y)$ to the form $\cos b_3 \cos y + \sin b_3 \sin y$ clearly shows that for determinate results both $\cos b_3$ and $\sin b_3$ must differ from zero. That is, plane TOP must not include either OM or OW.

The above analysis shows that except in the particular cases when TOP happens to lie at right angles with NOP, the three cores taken as indicated will give determinate results. Since the occurrence of the indeterminate condition would be very rare, the taking of an additional core or the location of the cutters in other positions which would avoid indeterminate results at the expense of ease of calculation would not be warranted. Furthermore, even in these cases in which indeterminate results are given by the formulæ, the actual directions of the strata planes may generally be ascertained by inspection.

In order to render the determination of $x$ and $y$ easy, charts may be provided from which $x$ and $y$ may be found given the determined values of $c_1$, $c_2$, and $c_3$. Other charts may be provided for referring the results to the usual geographical coordinates taking account of the slope and direction of the bore hole and the direction of the axis OM.

It will be obvious that the cores may be taken in relative directions other than those shown in which cases certain other specific indeterminate conditions may arise; for example, one of the cores may be taken in the direction of the bore hole's axis at the bottom thereof. Furthermore while there has been illustrated an instrument for taking three cores simultaneously, complete results may be obtained in accordance with the method by taking three or more cores successively at approximately the same depth, each, of course, having its orientation noted.

While three cores are necessary in general to give determinate results, it is within the province of the invention to take two cores either simultaneously or successively since, while the results would lead to fourfold solutions, other conditions, such as the observation of the depth of certain strata in an adjacent hole, might render easily determinable the true result.

The orientation of a plurality of cores in cases where a high degree of accuracy is not required may be accomplished by means of magnetic or other clinometers than the one illustrated; or, if merely the amount of dip of the bedding planes and not their direction is required, the orienting means may be dispensed with. It will be clear that only two cores need be taken in this last instance.

While there has been illustrated a specific coring mechanism which produces excellent, accurately oriented cores, the method may be carried out by equivalent mechanisms the construction of which will be readily apparent to those skilled in the art. For example, for the production of approximate results samplers of the type illustrated in S. H. Williston application Ser. No. 44,155 may be provided with rotating corers and used, samples being taken in different directions from the side walls of a bore hole and the orientation noted by the means described therein.

For simplicity in Fig. 5 the axes of the cutters have been assumed as intersecting at a point O, the actual axes being, of course, parallel to axes OM, OT and OW. Further, in the case of the apparatus shown the axes intersect the axis of the instrument or bore hole in which it lies. Obviously the axes may be off-center but parallel to the shown axes. The wording of the specific claims follows the convention of Fig. 5, it being understood that these claims are to include cases in which the axes are parallel to the specified directions.

What I claim and desire to protect by Letters Patent is:

1. The method of ascertaining the dip of a bedding plane intersected by a bore hole which includes taking adjacent the plane a plurality of cores whose axes extend in different directions and bear a determinable relationship with each other during the taking of the cores said cores being taken by straight line movements of angularly related cutters in the directions of said axis.

2. The method of ascertaining the dip of a bedding plane intersected by a bore hole which includes simultaneously taking adjacent the plane a plurality of cores whose axes extend in different directions and bear a determinable relationship with each other during the taking of the cores said cores being taken by straight line movements of angularly related cutters in the directions of said axis.

3. The method of ascertaining the dip of a bedding plane intersected by a bore hole which includes taking adjacent the plane by rotary cutting by means of angularly related cutters a plurality of cylindrical cores whose axes extend in different directions and bear a determinable relationship with each other during the cutting of the cores.

4. The method of ascertaining the dip of a bedding plane intersected by a bore hole which includes simultaneously taking adjacent the plane by rotary cutting by means of angularly related cutters a plurality of cylindrical cores whose axes extend in different directions and bear a determinable relationship with each other during the cutting of the cores.

5. The method of ascertaining the dip and strike of a bedding plane intersected by a bore hole which includes taking adjacent the plane a plurality of cores whose axes are oriented and extend in different angular directions during the taking of the cores.

6. The method of ascertaining the dip and strike of a bedding plane intersected by a bore hole which includes simultaneously taking adjacent the plane a plurality of cores whose axes are oriented and extend in different angular directions during the taking of the cores.

7. The method of ascertaining the dip and strike of a bedding plane intersected by a bore hole which includes taking adjacent the plane by rotary cutting a plurality of cylindrical cores whose axes are oriented and extend in different angular directions during the cutting of the cores.

8. The method of ascertaining the dip and strike of a bedding plane intersected by a bore hole which includes simultaneously taking adjacent the plane by rotary cutting a plurality of cylindrical cores whose axes are oriented and extend in different angular directions during the cutting of the cores.

9. The method of ascertaining the dip and strike of a bedding plane intersected by a bore hole which includes taking adjacent the plane by rotary cutting three cylindrical cores whose axes are oriented and extend in different directions.

10. The method of ascertaining the dip and strike of a bedding plane intersected by a bore hole which includes taking adjacent the plane by rotary cutting three cylindrical cores whose axes are oriented and extend in different directions, two of the axes being substantially perpendicular to each other and to the axis of the bore hole, and the third axis forming other than right angles with the other two core axes and the axis of the bore hole.

11. The method of ascertaining the dip and strike of a bedding plane intersected by a bore hole which includes simultaneously taking adjacent the plane by rotary cutting three cylindrical cores whose axes are oriented and extend in different directions.

12. The method of ascertaining the dip and strike of a bedding plane intersected by a bore hole which includes simultaneously taking adjacent the plane by rotary cutting three cylindrical cores whose axes are oriented and extend in different directions, two of the axes being substantially perpendicular to each other and to the axis of the bore hole, and the third axis forming other than right angles with the other two core axes and the axis of the bore hole.

In testimony of which invention, I have hereunto set my hand, at Dallas, Texas, on this 14th day of November, 1930.

CHARLES R. NICHOLS.